United States Patent [19]

Kappaz

[11] Patent Number: 5,388,854
[45] Date of Patent: Feb. 14, 1995

[54] FOLDABLE SHOPPING CART WITH A PLURALITY OF LOAD SUPPORTS

[75] Inventor: Nelson Kappaz, Sao Paulo, Brazil

[73] Assignee: Kappaz S/A, San Paulo, Brazil

[21] Appl. No.: 171,095

[22] Filed: Dec. 21, 1993

[51] Int. Cl.⁶ .................................................. B62B 1/12
[52] U.S. Cl. ........................ 280/652; 280/47.19; 280/47.33; 280/DIG. 4
[58] Field of Search ............... 280/47.19, 47.26, 47.33, 280/652, 79.2, 79.3, 33.996, 645, 659, DIG. 3, DIG. 4

[56] References Cited

U.S. PATENT DOCUMENTS

| | | | |
|---|---|---|---|
| D. 182,180 | 2/1958 | Grebow | 280/652 X |
| 2,658,703 | 11/1953 | Brink et al. | 280/47.33 X |
| 3,052,484 | 9/1962 | Huffman et al. | 280/47.19 X |
| 3,168,328 | 2/1965 | Hill, Sr. | 280/652 X |
| 3,640,547 | 2/1972 | Friedman | 280/652 |
| 3,997,213 | 12/1976 | Smith et al. | 280/652 X |
| 4,199,171 | 4/1980 | Betts | 280/652 |
| 5,192,092 | 3/1993 | DiBeneditto | 280/47.19 X |

*Primary Examiner*—Brian L. Johnson
*Attorney, Agent, or Firm*—Herbert Dubno

[57] ABSTRACT

A small foldable shopping cart having a large central load-supporting section defined between front and rear U-shaped frames and pivotally connected to a handle also of U-shaped whose shanks provide rests below the central load-supporting section. At the front frame, a pair of small load-supporting sections are pivotally connected and at the rear frame, another small load-supporting section is pivotally connected.

1 Claim, 1 Drawing Sheet

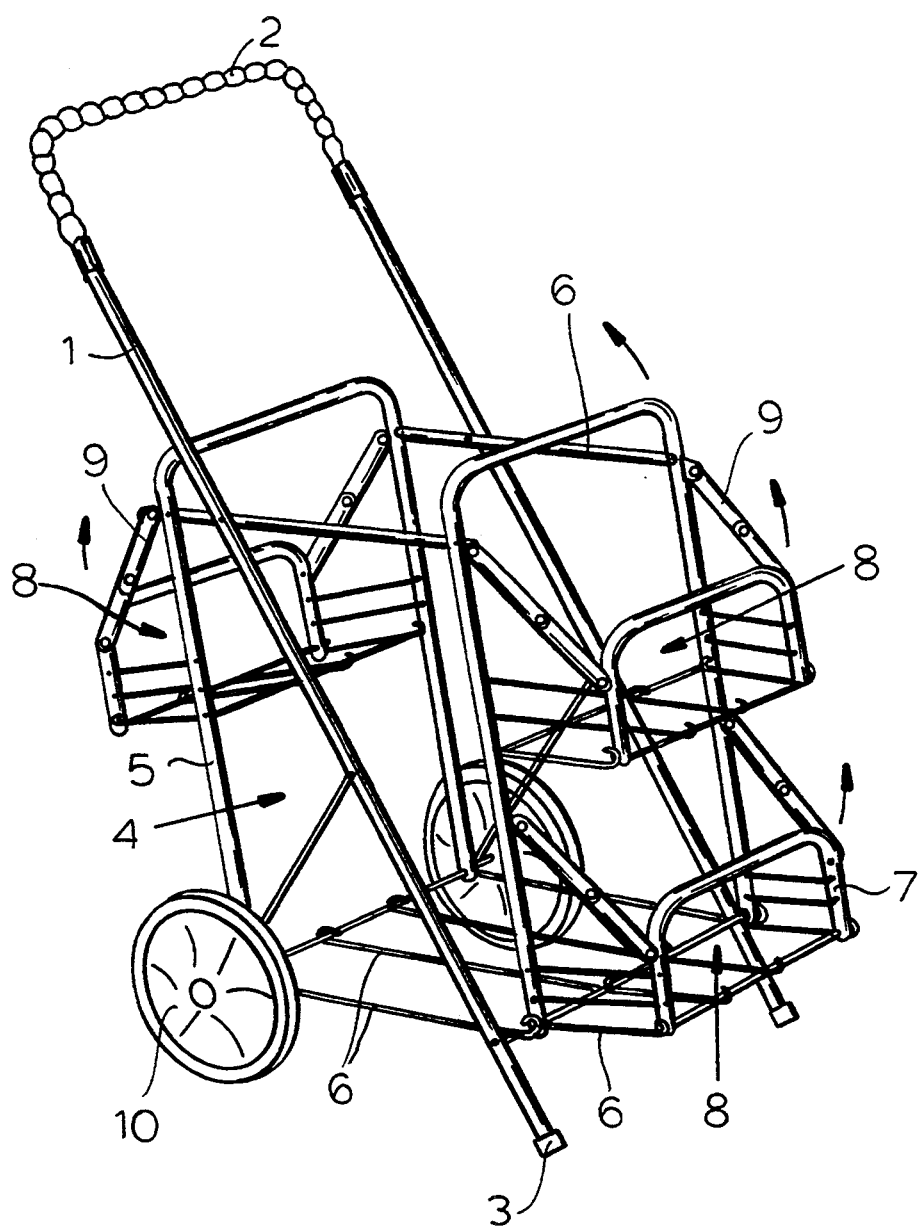

FOLDABLE SHOPPING CART WITH A PLURALITY OF LOAD SUPPORTS

FIELD OF THE INVENTION

This invention relates to a foldable small shopping cart made of metal tubes constituted of three small enclosures or sections connected to a (central) larger enclosure or section, the construction of which allows the entire set to fold, thereby reducing the space taken up by the cart when out of use.

BACKGROUND OF THE INVENTION

Small shopping carts have generally a similar shape although they are manufactured by different manufacturers. These small carts are usually made with a vertical section, foldable or not, provided with a horizontal tilting section.

Although these known small shopping carts are practical, they have a low load capacity.

OBJECT OF THE INVENTION

It is an object of the invention to provide a cart incorporating technical improvements thereby guaranteeing load capacity optimization and making the use thereof more practical, thereby allowing crushable and breakable products such as eggs, tomatoes, grapes and so on to be separated.

In addition, when the small car is folded, its volume should be equivalent to a conventional folded small cart. Furthermore pivoting of the parts of said claimed small shopping carts is fully horizontal.

SUMMARY OF THE INVENTION

The invention relates to a small foldable shopping cart having a large section to which projecting load supporting sections are pivoted through horizontal pivots, with a U-shaped handle being transversely pivoted to the large section. The handle can be provided with a covering and with shoes forming rests below the large section to support the cart. The large section is made of U-shaped frames interconnected by pivotal elements which interconnect also the smaller frames to the large section. Linked or articulated arms support the small load supporting sections and a pair of wheels are attached to one of the frames of the central section. Two such small sections project from the front of the cart while one section projects from the rear of the cart.

BRIEF DESCRIPTION OF THE DRAWING

The above and other objects, features and advantages of the present invention will become more readily apparent from the following description, reference being made to the accompanying drawing, the sole FIGURE of which is a perspective view showing the shopping cart of the invention in an unfolded state.

SPECIFIC DESCRIPTION

The foldable cart of the invention comprises a set of divisions or sections pivoted to each other by horizontal pivots and has a "U" shaped handle 1 provided with a covering 2 and shoes 3. A central section 4 is made of two "U" shaped frames 5 interconnected by pivoted elements 6.

Said elements 6 being lengthwise provided on the small cart are pivoted and also interconnect smaller frames 7 to frames 5 thereby making up projecting divisions or sections 8 which are provided with supporting linked arms 9.

At the backside part of said small car there are wheels 10 mounted at one of the axles of the assembly.

As can be seen from FIG. 1, therefore, the main load supporting section is formed between a forwardly position U-shaped frame 5 and a rearwardly position U-shaped frame 5, the front frame carrying two smaller load supporting sections disposed one above the other and the rear carrying a third load supporting section. Each of these smaller load supporting sections has a U-shaped member 7 connected by articulated links 9 pivotively with the front or rear U-shaped frame of the central load supporting section, and a plurality of bars which are pivotively connected to the U-shaped frame and the U-shaped frame member, respectively, to form platforms for the smaller load-supporting sections.

What is claimed is:

1. A foldable shopping cart, comprising:
   a pair of parallel downwardly open upright U-shaped frames interconnected by elements pivotally connected to said frames to form a central load-supporting section, one of said frames being located forwardly of the other of said frames;
   a U-shaped handle having downwardly extending shanks hingedly connected to said central load-supporting section and extending downwardly and forwardly to form rests for the cart below said central load-supporting section;
   wheels rotatable mounted on said central load-supporting section rearwardly of said rests;
   a pair of front load-supporting sections disposed one above another and pivotally connected to said one of said frames, each of said front load-supporting sections including a U-shaped frame member forwardly of said one of said frames, a pair of articulated links pivotally connecting said frame member to shanks of said one of said frames, and a plurality of rods pivotally connected to said one of said frames and to said frame member and forming a platform for the respective front load-supporting section in an unfolded position of the cart; and
   a rear load-supporting section pivotally connected to the other of said frames, said rear load-supporting section including a U-shaped frame member rearwardly of said other of said frames, a pair of articulated links pivotally connecting said frame member of said rear load-supporting section to shanks of said other of said frames, and a plurality of rods pivotally connected to said other of said frames and to said frame member of said rear load-supporting section and forming a platform for the rear load-supporting section in an unfolded position of the cart.

* * * * *